United States Patent [19]
Ho

[11] Patent Number: 5,821,905
[45] Date of Patent: Oct. 13, 1998

[54] MICROWAVE ANTENNA REGULATING DEVICE FOR AN AUTOMATIC DOOR

[76] Inventor: Jan-Shein Ho, 3rd Floor, No. 8, Chung Cheng Road, Szu We Lane, Alley 8, Hsin Tien City, Taipei Hsien, Taiwan

[21] Appl. No.: 658,053

[22] Filed: Jun. 4, 1996

[51] Int. Cl.⁶ .................................................. H01Q 3/08
[52] U.S. Cl. ............................................ 343/765; 343/882
[58] Field of Search ..................................... 343/765, 757, 343/880, 882; H01Q 3/00, 3/02, 3/08

[56] References Cited

U.S. PATENT DOCUMENTS

| | | | |
|---|---|---|---|
| 4,117,464 | 9/1978 | Lutz | 340/554 |
| 4,563,687 | 1/1986 | Berger | 343/765 |

*Primary Examiner*—Michael C. Wimer
*Attorney, Agent, or Firm*—Woodard Emhardt Naughton Moriarty & McNett

[57] ABSTRACT

This invention relates to a microwave antenna regulating device for an automatic door, in which an antenna of a microwave radar automatic door sensor is mounted on a rotating disk of a regulating device which can adjust the detecting direction on a base in leftward and rightward directions. The rotating disk is provided with holding means for further adjusting the detecting direction of the antenna in backward and forward directions. Therefore, the regulating device can adjust the microwave antenna in backward-forward and leftward-rightward directions whereby when the microwave radar sensor is used in the actuating switch of an automatic door, the detecting range can be arbitrarily adjusted by adjusting the direction of the antenna according to the environmental condition to make the opening or closing of the automatic door more active and optimize the function of the automatic door.

2 Claims, 5 Drawing Sheets

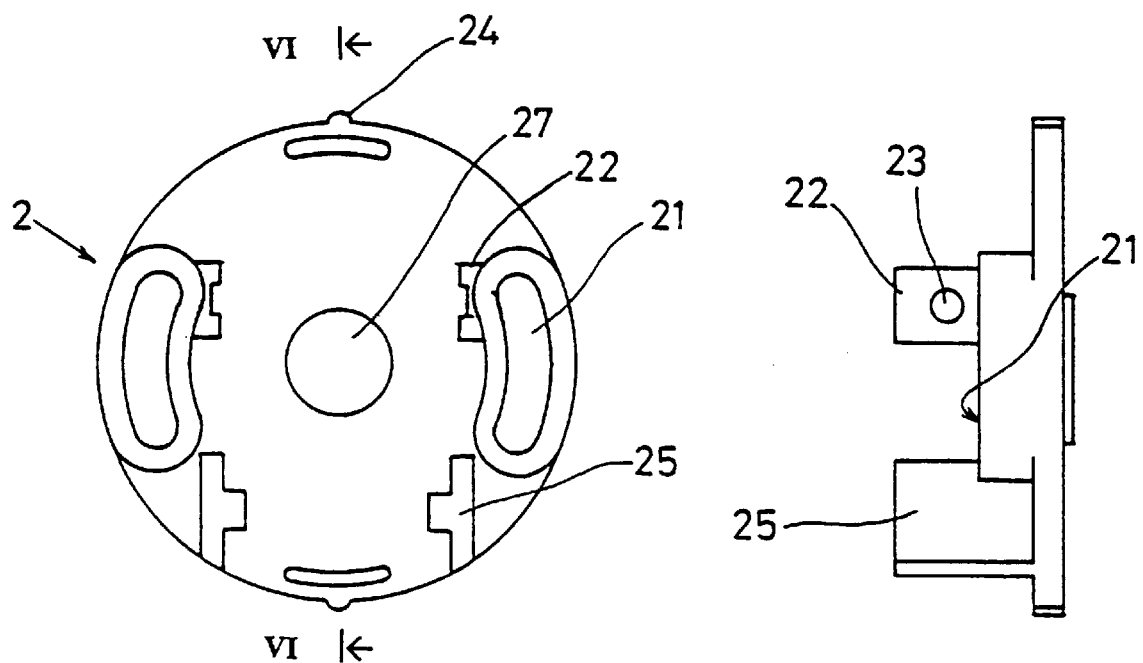
Fig. 4   Fig. 6
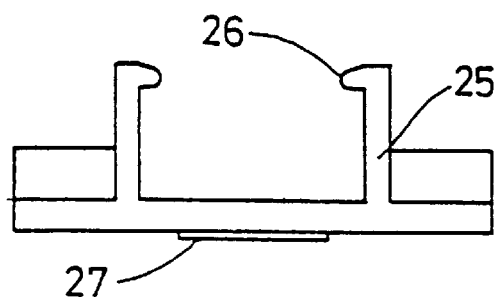
Fig. 5

MICROWAVE ANTENNA REGULATING DEVICE FOR AN AUTOMATIC DOOR

FIELD OF THE INVENTION

This invention relates generally to an antenna regulating device of a microwave radar sensor, in particularly, to an antenna regulating device of a microwave radar sensor for an actuating switch of an automatic door.

BACKGROUND OF THE INVENTION

Known antennas of microwave radar automatic door sensors all are waveguide antennas mounted at a specific angle, used for transmitting the microwave generated by a microwave frequency oscillator such that the sensor can detect within the detecting range the movement of a human body or an object by utilizing Doppler effect of frequency shift due to the moving speed of the object when the microwave is reflected by the moving object, and then after the microwave signal transmitted back is processed through a specific circuit, the signal will be output to an actuating driving device for controlling the opening or closing of the automatic door.

The detecting range of the known automatic door sensors is not accurate such that the response of the automatic door is tardy; i.e., the automatic door can not be opened timely, which usually causes the incoming or outgoing people to hit on the unopened automatic door.

SUMMARY OF THE INVENTION

In this invention, an antenna of a microwave radar automatic door sensor is mounted on a rotating disk of a regulating device which can adjust the detecting direction on a base in leftward and rightward directions. The rotating disk is provided with holding means for further adjusting the detecting direction of the antenna in backward and forward directions. Therefore, the regulating device can adjust the antenna of the microwave radar sensor in backward-forward and leftward rightward directions whereby when the microwave radar sensor is used in the actuating switch of the automatic door, the detecting range can be arbitrarily adjusted by adjusting the direction of the antenna according to the environmental condition to make the opening or closing of the automatic door more active and optimize the function of the automatic door in order to match the incoming or outgoing people, which can actually eliminate the drawback of the known microwave radar automatic door sensors that the detecting range of the known microwave radar automatic door sensors is not accurate, which causes the tardy response of the automatic door such that the incoming or outgoing people usually hit on the automatic door unopened timely. Hence, general users themselves can optimize the detecting direction by adjusting the direction of the antenna of the microwave radar automatic door sensor without the help of trained technical persons whereby the service fee can be saved and the previous long adjusting time can be reduced.

DESCRIPTION OF THE DRAWINGS

FIG. 4 is a front view showing a rotating disk of the antenna regulating device of the invention;

FIG. 5 is a sectional view taken along Line V—V of FIG. 4;

FIG. 6 is a sectional view taken along Line VI—VI of FIG. 4;

DETAILED DESCRIPTION OF THE INVENTION

Figure 1:
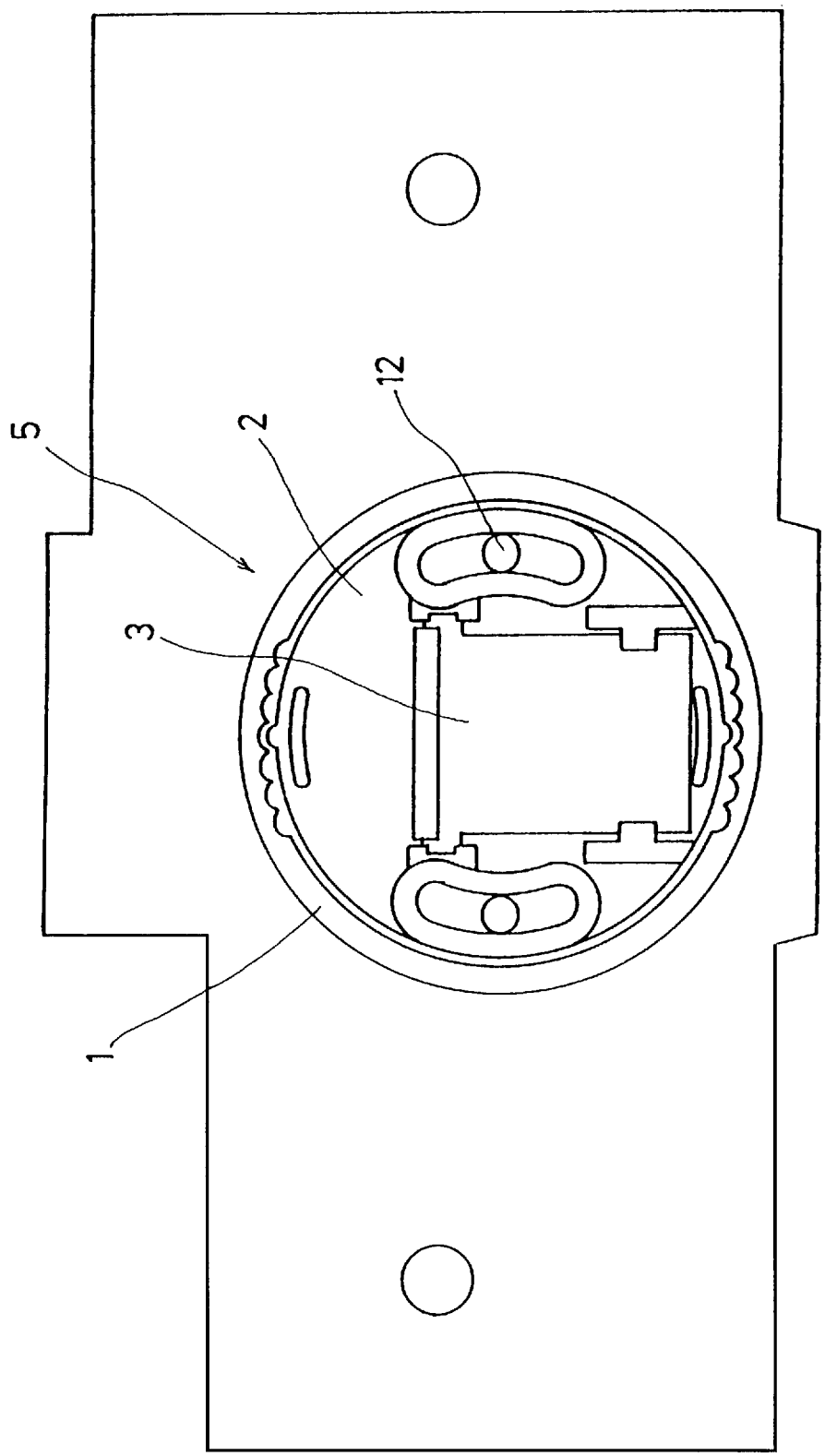
FIG. 1 is a front view showing an antenna regulating device of a microwave radar sensor (which will be referred as an antenna regulating device hereinafter) in accordance with the present invention.
Figure 2:
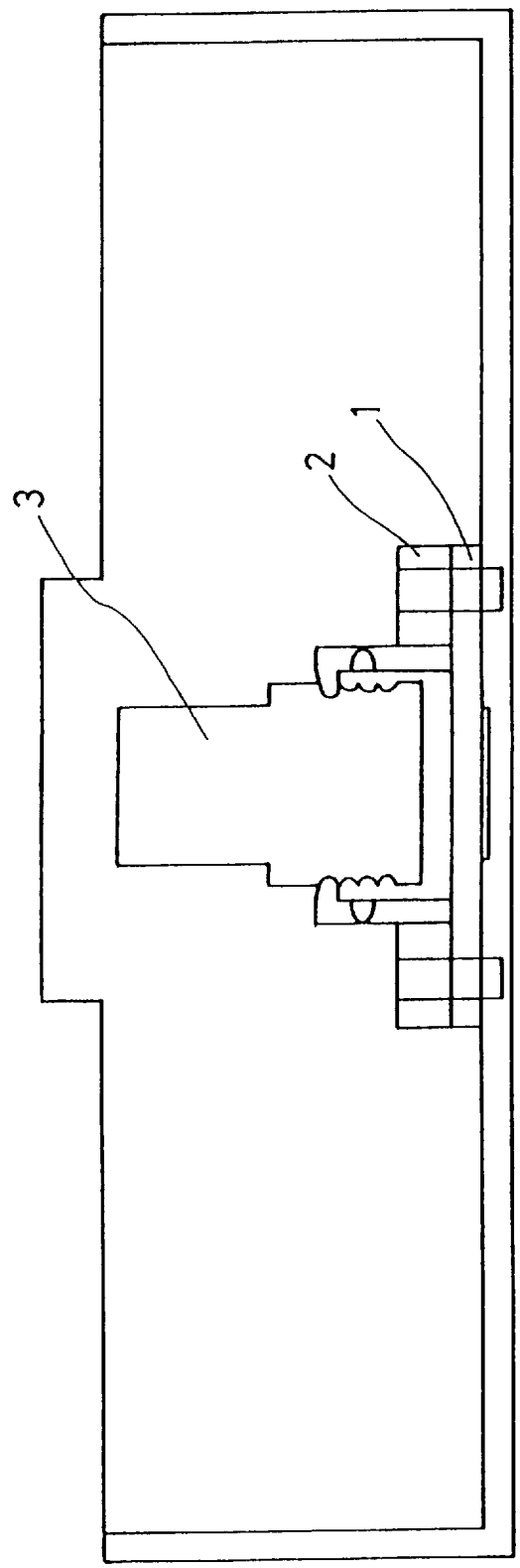
FIG. 2 is a bottom view showing the antenna regulating device of FIG. 1.

Please refer to FIGS. 1 and 2. The antenna regulating device 5 of the invention comprises the following elements.

Figure 3:
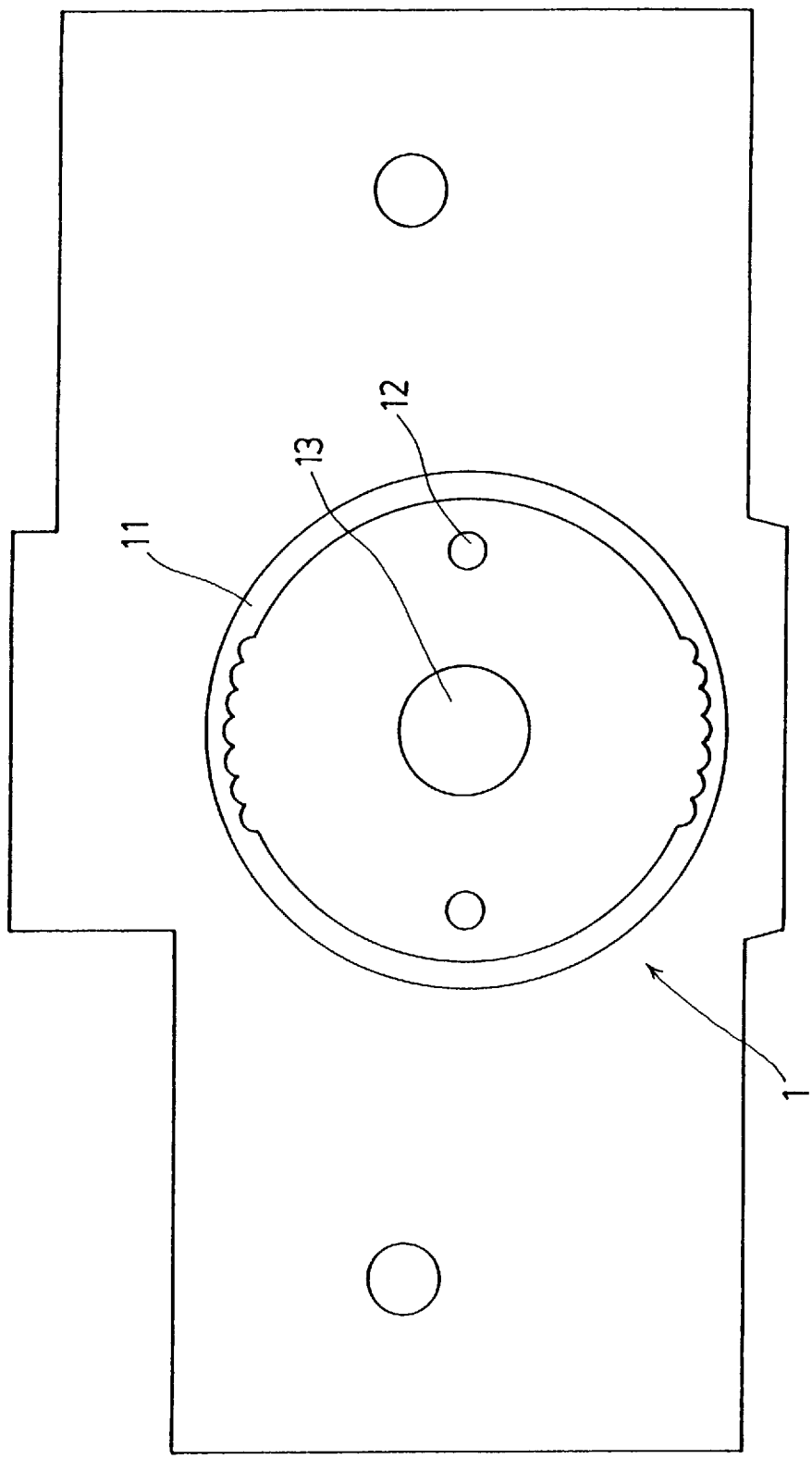
FIG. 3 is a front view showing a base of the antenna regulating device of the invention.

A base 1 is of an annular shape (please refer to FIG. 3). The inner edges of the upper and lower sides of the base 1 are provided with a small corrugated tooth portion 11 respectively, and the left and right sides of the base 1 are provided with a stop rod 12 respectively. The middle of the base 1 has a circular aperture 13.

A rotating disk 2 is of a round disk shape (please refer to FIGS. 4, 5 and 6), of which the left and right sides are provided with an elliptic groove 21 respectively for engaging with the stop rod 12. An upper plate 22 having a pin hole 23 is mounted at each elliptic groove 21, near the middle of the rotating disk 2. The upper and lower sides of the outer edge of the rotating disk 2 have a pin 24 respectively for engaging with the tooth portion 11 of the base 1 such that the rotating disk 2 can rotate in leftward and rightward directions within the tooth portion 11, its rotating range being limited by the gap between the stop rod 12 and the elliptic groove 21. The left and right sides of the lower portion of the rotating disk 2 have a lower plate 25 respectively, and each lower plate 25 has a tip 26 provided at the inner side of the top thereof. A shaft 27 provided at the middle of the rotating disk 2 protrudes downward for being inserted into the circular aperture 13 of the base 1 and used as a rotating shaft.

Figure 9:
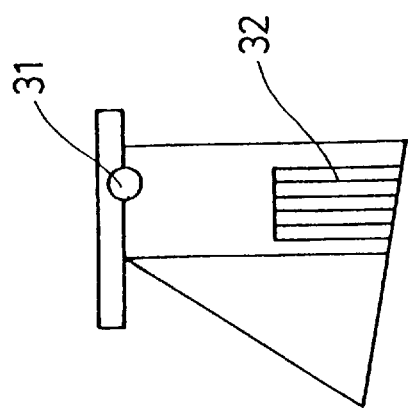
FIG. 9 is a right view showing the antenna of the antenna regulating device of FIG. 7.
Figure 8:
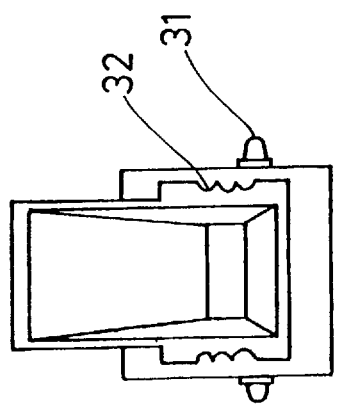
FIG. 8 is a bottom view showing the antenna of the antenna regulating device of FIG. 7.
Figure 7:
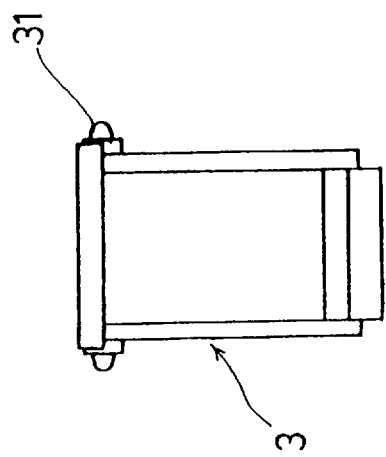
FIG. 7 is a front view showing the antenna of the antenna regulating device of the invention.

An antenna 3 is a waveguide antenna of a hollow hopper shape (please refer to FIGS. 7, 8 and 9). The left and right sides of the upper portion of the antenna are provided with a pin 31 respectively for being inserted into the pin hole 23 of the rotating disk 2 such that the antenna 3 can rotate in forward and backward directions to adjust the direction of the antenna. The left and right sides of the antenna 3 have a saw-tooth groove 32 respectively for engaging with the tip 26 of the lower plate 25 of the rotating disk 2 whereby the antenna 3 can rotate about the pins 31. By adjusting the engaging position between the tip 26 and the groove 32 in forward and backward directions to accurately adjust the direction of the wave transmission and receiving of the antenna in forward and backward directions, and with the leftward or rightward rotation of the rotating disk 2 on the base 1, the antenna regulating device of the invention can adjust the antenna 3 within 45° in the forward-backward and leftward rightward directions such that the detecting range of the microwave radar sensor of the actuating switch for the automatic door can be easily adjusted in a considerably wide range, and the users can arbitrarily adjust the microwave radar antenna regulating ice according to the environmental condition. Hence, the invention can be lied to various use environment.

BRIEF DESCRIPTION OF THE REFERENCE NUMERALS

| 1 | base | 22 | upper plate |
|---|---|---|---|
| 2 | rotating disk | 23 | pin hole |
| 3 | antenna | 24 | pin for rotating disk |
| 5 | antenna regulating device | 25 | lower plate |
| 11 | tooth portion | 26 | tip |
| 12 | stop rod | 27 | shaft for rotating disk |
| 13 | circular aperature | 31 | pin for antenna |
| 21 | elliptic groove | 32 | groove for antenna |

What is claimed is:

1. A microwave antenna regulating device for an automatic door, comprising:

annular base having upper and lower sides with inner edges that are provided with corrugated tooth portions, and having left and right sides each provided with a stop rod; said base having a circular aperture provided in the middle thereof;

a rotating disk of substantially round disk shape, having upper and lower sides with outer edges and with left and right sides, each provided with an elliptic groove for engaging one of said stop rods, and upstanding upper plates having pin holes at each elliptic groove; the outer edge of the upper and lower sides of said rotating disk having a plurality of pins for engaging the tooth portions of said base such that said rotating disk can rotate in leftward and rightward directions within the tooth portions, its rotating range being limited by the interaction of said stop rods and said elliptic grooves; the left and right sides of said rotating disk also having an upstanding lower plate, and each lower plate having and inner side provided with a tip near the top thereof; and a shaft provided at the middle of the rotating disk protruding downward for being inserted into the circular aperture of said base and used as a rotating shaft;

an antenna being a waveguide antenna having an upper portion in the left and right sides; the left and right sides of the upper portions of said antenna each being provided with a pin for being inserted into the pin hole of said rotating disk such that said antenna can rotate in a forward and backward directions to adjust the direction of said antenna; the left and right sides of said antenna having a saw-tooth groove respectively for engaging with the tip of each said lower plate of said rotating disk whereby said antenna can rotate about the pins of said antenna; characterized in that:

said antenna is mounted on said rotating disk; by adjusting the engaging position between the tips of said lower plate of said rotating disk and the saw-tooth groove of said antenna, the direction of the wave transmission and receiving of said antenna can be accurately adjusted in forward and backward directions, and by adjusting the engaging position between the pins of said rotating disk and the tooth portions of said base, the direction of the wave transmission and receiving of said antenna can be accurately adjusted in forward and backward directions, and by adjusting the engaging position between the pins of said rotating disk and the tooth portions of said base, the direction of the wave transmission and receiving of said antenna can be accuratley adjusted in leftward and rightward directions.

2. A microwave antenna regulating device for an automatic door as claimed in claim 1, wherein said antenna of said microwave antenna regulating device can be adjusted within 45° in the forward-backward and leftward-rightward directions.

* * * * *

UNITED STATES PATENT AND TRADEMARK OFFICE
CERTIFICATE OF CORRECTION

PATENT NO : 5,821,905

DATED : October 13, 1998

INVENTOR(S) : HO, Jan-Shein

It is certified that error appears in the above-identified patent and that said Letters Patent is hereby corrected as shown below:

Title page, item [56] insert:

--C&K Systems, Inc., Model 7110 Rex brochure, printed in Honk Kong, P/N 5051014, Rev. 4, January 1987. Microwave Sensors, Inc. D7 Door Activator for Automatic Doors brochure--

In column 2, line 65, please change "ice" to --device--.

In column 2, line 66, please change "lied" to --applied--.

In column 3, line 10, please change "aperature" to --aperture--.

In column 3, line 20, please insert --a-- after "of".

In column 3, line 33, please change "and" to --an--.

In column 4, line 6, please delete "a".

In column 4, line 28, please change "accuratley" to --accurately--.

Signed and Sealed this

Thirteenth Day of April, 1999

Attest:

Q. TODD DICKINSON

*Attesting Officer*     *Acting Commissioner of Patents and Trademarks*